United States Patent
Seppala et al.

(10) Patent No.: US 7,208,849 B2
(45) Date of Patent: Apr. 24, 2007

(54) DETACHABLE TRANSMISSION SHIFT LEVER ARRANGEMENT

(75) Inventors: Eric A. Seppala, Auburn Hills, MI (US); Michael E Brown, Davison, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 469 days.

(21) Appl. No.: 10/901,496

(22) Filed: Jul. 28, 2004

(65) Prior Publication Data
US 2006/0033384 A1 Feb. 16, 2006

(51) Int. Cl.
*B60R 25/04* (2006.01)
*B60R 25/06* (2006.01)

(52) U.S. Cl. .................................................. 307/10.5

(58) Field of Classification Search ................ 307/10.5
See application file for complete search history.

*Primary Examiner*—Stephen W. Jackson
*Assistant Examiner*—Adi Amrany
(74) *Attorney, Agent, or Firm*—Thomas A. Jurecko

(57) ABSTRACT

A detachable transmission shift lever theft deterrent arrangement is provided that includes a transmission shift stub accessible from a vehicle interior. A detachable shift lever is provided and arranged to slideably engage the transmission shift stub. A locking mechanism is positioned on the shift lever and arranged to engage the shift stub. A security system including a transponder is positioned on the shift lever, and the transponder is arranged to receive power from an antenna positioned on the shift stub and send a unique signal back to the antenna upon positioning the shift lever within a predetermined range of the antenna. A vehicle ignition system is then enabled when the antenna receives the unique signal from the transponder.

10 Claims, 1 Drawing Sheet

DETACHABLE TRANSMISSION SHIFT LEVER ARRANGEMENT

FIELD OF INVENTION

The present invention relates generally to theft deterrent systems for a motor vehicle, and, more particularly, to a detachable transmission shift lever theft deterrent arrangement for a motor vehicle.

BACKGROUND OF INVENTION

There are numerous theft deterrent systems that are generally known in the art. One commonly used theft deterrent system is an alarm type system that, when set off, is designed to attract attention to the vehicle. Another common theft deterrent system is a device that locks a steering wheel in place. This system is generally not part of the motor vehicle and requires a user to install and lock the system to the steering wheel each time the device is used.

While such theft deterrent systems are generally viewed as being more effective than not using such a system, they often require equipment that is not part of the motor vehicle. In addition, such systems do not operate to disable the vehicle, i.e., they do not independently render an essential electrical or mechanical system of a motor vehicle inoperable.

SUMMARY OF INVENTION

Accordingly, an improved theft deterrent arrangement for a motor vehicle is provided that independently prevents both a vehicle ignition system and a transmission from operating. In accordance with one aspect of the present invention, a detachable transmission shift lever arrangement is provided that includes a transmission shift stub accessible from a vehicle interior. A detachable shift lever is arranged to slideably engage the transmission shift stub. A locking mechanism is positioned on the shift lever and arranged to engage the shift stub. A security system including a transponder is positioned on the shift lever, and the transponder is arranged to receive power from an antenna positioned on the shift stub and send a unique signal back to the antenna upon positioning the shift lever within a predetermined range of the antenna. A vehicle ignition system is then enabled when the antenna receives the unique signal from the transponder.

BRIEF DESCRIPTION OF DRAWINGS

Other aspects, features, and advantages of the present invention will become more fully apparent from the following detailed description of the preferred embodiment, the appended claims, and in the accompanying drawings in which:

DETAILED DESCRIPTION OF EXEMPLARY EMBODIMENT

Figure 1:
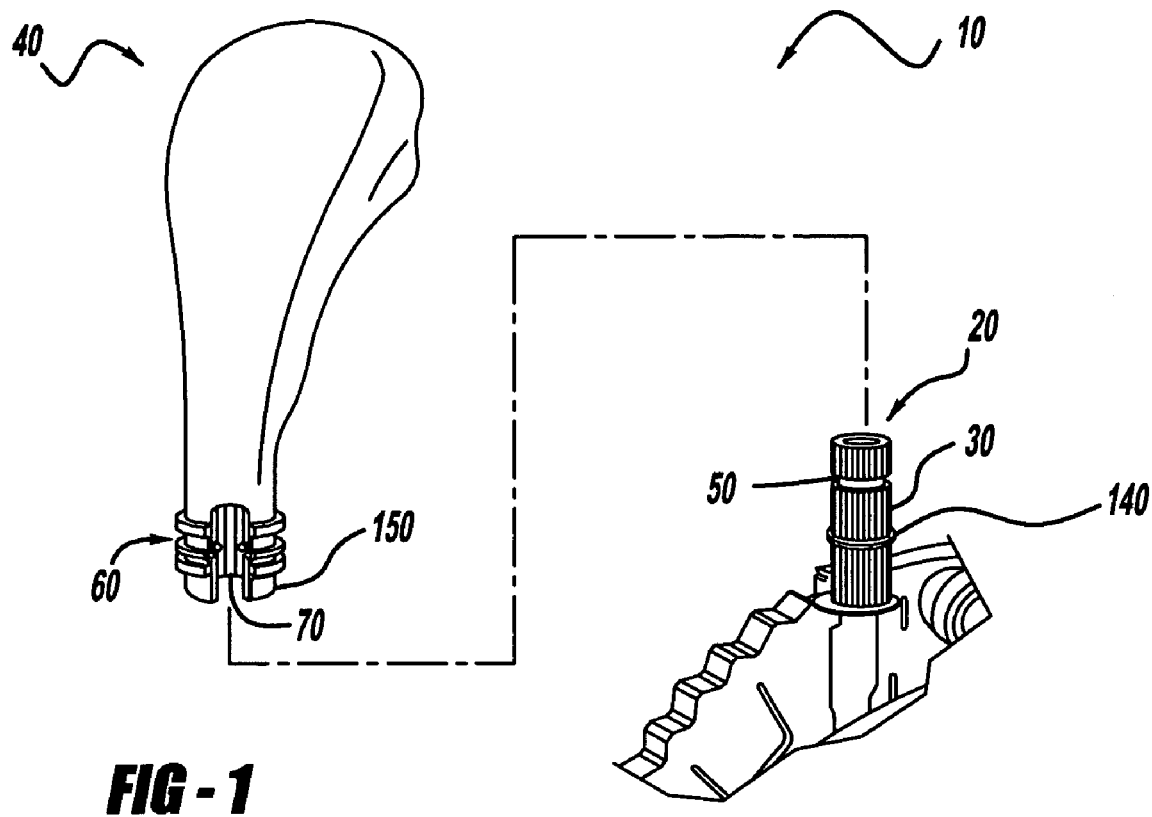
FIG. 1 illustrates an isometric view of a detachable transmission shift lever theft deterrent arrangement including a detachable shift lever assembly with a sectional cut-out and a transmission shift stub in accordance with the present invention.
Figure 2:
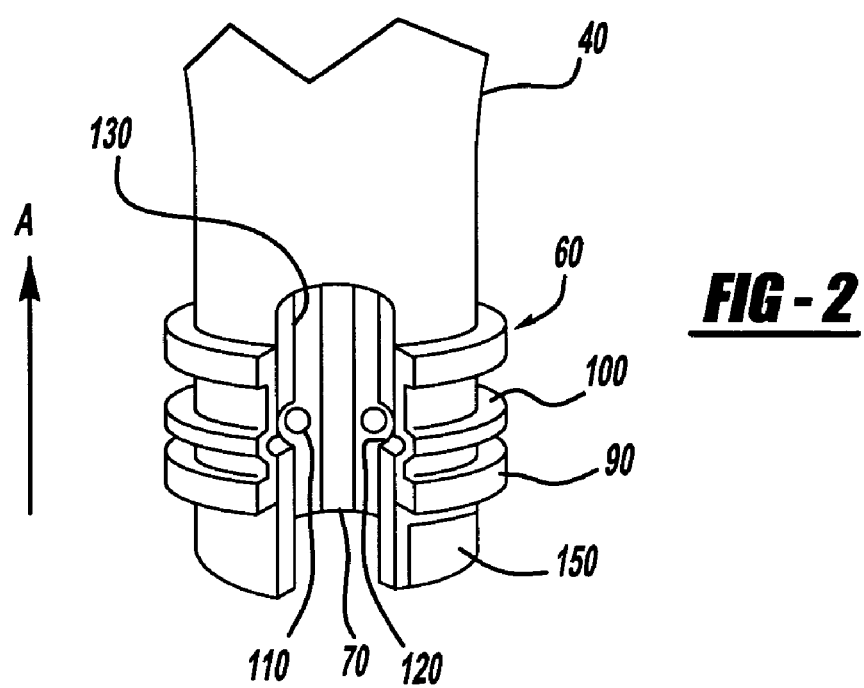
FIG. 2 illustrates an exploded view of a locking mechanism of the shift lever assembly shown in FIG. 1 in accordance with the present invention.

In the following description, several well-known features of a transmission shift stub and shift lever are not shown or described so as not to obscure the present invention. Referring now to the drawings, FIGS. 1 and 2 illustrate an exemplary embodiment of a detachable transmission shift lever theft deterrent system. In accordance with one aspect of the current invention, a detachable transmission shift lever theft deterrent system 10 is provided. System 10 includes a transmission shift stub 20 accessible from a vehicle interior (not shown). Shift stub 20 includes splines 30 arranged to slideably engage a transmission shift lever assembly 40. Shift stub 20 also includes a circumferential detent 50 arranged to engage a locking mechanism 60 upon a positioning of detachable shift lever assembly 40 on shift stub 20.

In addition to conventional features included on a transmission shift lever assembly, shift lever assembly 40 also includes splines 70 arranged to slideably engage splines 30 of the shift stub 20. It is also possible to vary the spline configuration for each vehicle and thus provide an additional level of security in that each detachable transmission shift lever assembly would be unique to a particular vehicle. Shift lever locking mechanism 60 is substantially the same as known quick connect systems used for air hose connections. Locking mechanism 60 includes a spring biased collar 90 having a circumferential detent 100. Locking mechanism 60 further includes spring biased bearings 110 positioned in a circumferential groove 120 of shift lever assembly 40.

To position shift lever assembly 40 on shift stub 20, locking collar 90 is translated in the direction of arrow A. This aligns locking collar detent 100 with shift lever detent 120 and allows bearings 110 to retract into collar detent 100 and not radially protrude beyond shift lever assembly 40 inside diameter 130. Upon sliding shift lever assembly 40 over shift stub 20, locking collar 100 can be released. When bearings 110 align with detent 50 in shift stub 20, the bearings will move radially into detent 50 allowing locking collar 90 to translate in a direction opposite of arrow A which will prevent bearings 110 from retracting from detent 50. Shift lever assembly 40 is now effectively held in place on shift stub 20 by bearings 110 engaging both detent 120 and detent 50 of shift lever 40 and shift stub 20, respectively.

To remove shift lever assembly 40 from shift stub 20, locking collar 60 is again translated in the direction of arrow A. This allows bearings 110 to retract into locking collar detent 100 as described above. Once retracted into collar detent 100, bearings 110 are no longer engaging shift stub detent 50 and shift lever assembly 40 can then be slideably removed from shift stub 20.

Detachable shift lever theft deterrent system 10 further includes a security system linked to a vehicle ignition system. This security system provides increased theft deterrence in addition to removal of the transmission shift lever assembly 40. In the exemplary embodiment, the security system arrangement operates similar to that of Daimler-Chrysler Corporation's Sentry Key® Engine Immobilizer system. More specifically, the security system arrangement includes an antenna 140 positioned on transmission shift stub 20 and connected to an engine control system (not shown). A transponder 150 is provided and positioned on a lower end of shift lever assembly 40. In operation, when transponder 150 is placed within a predetermined close proximity to antenna 140, antenna 140 supplies electrical power to transponder 150 and receives a signal back from transponder 150. The signal, which is unique or different for each vehicle, is then sent to the engine control module. The engine control module compares the received signal with an internal code that is maintained in the control module. If the received signal and the internal code match, the engine control module continues normal engine operation (i.e., permit the vehicle to be started). If the received signal does not match the internal code or is not present, the engine control module is instructed to turn the engine off.

In operation, the detachable transmission shift lever theft deterrent system provides multiple levels of theft deterrence without requiring add-on equipment that is not incident to the vehicle's operation. Detaching the shift lever assembly from the shift stub prevents a perpetrator from being able to operate the vehicle transmission. In addition, with the security system incorporated into the shift lever assembly, the engine will not operate as the antenna will not be receiving the unique signal from the transponder mounted in the shift lever assembly. Furthermore, when the shift lever is removed or detached from the transmission shift stub, it is readily apparent to a perpetrator that the shift lever has been removed and this provides additional deterrence to the perpetrator to not even attempt to obtain entry into the vehicle.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A detachable transmission shift lever arrangement for a motor vehicle, the arrangement comprising:
    a transmission shift stub accessible from a vehicle interior;
    a detachable transmission shift lever arranged to slideably engage the transmission shift stub;
    a locking mechanism positioned on the shift lever and arranged to engage the shift stub; and
    a security system including a transponder positioned on the shift lever, the transponder arranged to send a unique signal to an antenna positioned on the shift stub upon a positioning of the shift lever within a predetermined range of the antenna;
    wherein a vehicle ignition system is enabled when the antenna receives the signal from the transponder.

2. The detachable transmission shift lever arrangement of claim 1, wherein the shift stub includes a circumferential detent formed on an exterior surface of the shift stub, and wherein the shift lever locking mechanism is arranged to engage the shift stub detent upon positioning the shift lever on the shift stub.

3. The detachable transmission shift lever arrangement of claim 2, wherein the locking mechanism includes a slideable collar and bearing arrangement, the collar arranged to slide axially on the shift lever and release the bearing arrangement from the detent on the shift stub.

4. The detachable transmission shift lever arrangement of claim 3, wherein the collar includes a circumferential detent arranged to receive the bearing arrangement upon sliding the collar axially along the shift lever to align the collar detent with the bearing arrangement.

5. The detachable transmission shift lever arrangement of claim 1, wherein the antenna communicates with an engine control module to compare the unique signal to a code stored in the engine control module.

6. The detachable transmission shift lever arrangement of claim 5, wherein the engine controller enables engine operation when the unique signal is present and determined to match the code.

7. The detachable transmission shift lever arrangement of claim 1, wherein the shift lever includes splines positioned on an inner surface and arranged to engage the shift stub, and wherein the shift stub includes splines arranged to mate with the shift lever splines.

8. The detachable transmission shift lever arrangement of claim 7, wherein the shift lever splines and the shift stub splines are arranged in a configuration unique to a vehicle.

9. The detachable transmission shift lever arrangement of claim 1, wherein the transponder is molded into a base on the shift lever.

10. The detachable transmission shift lever arrangement of claim 1, wherein the transponder receives power from the antenna when the shift lever is positioned within a predetermined range of the antenna.

* * * * *